(12) United States Patent
Kouno (10) Patent No.: US 8,336,938 B2
(45) Date of Patent: Dec. 25, 2012

(54) CAP MOUNTING STRUCTURE

(75) Inventor: Kazunori Kouno, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 258 days.

(21) Appl. No.: 12/782,061

(22) Filed: May 18, 2010

(65) Prior Publication Data

US 2010/0293862 A1    Nov. 25, 2010

(30) Foreign Application Priority Data

May 19, 2009    (JP) .................................. 2009-120684

(51) Int. Cl.
*B60J 7/00* (2006.01)
(52) U.S. Cl. ....................................... 296/1.08; 296/191
(58) Field of Classification Search ................. 296/1.08, 296/1.07, 191, 202, 37.8, 37.13, 146.7; 280/730.2
See application file for complete search history.

(56) References Cited

U.S. PATENT DOCUMENTS

| | | | |
|---|---|---|---|
| 6,550,835 B2 * | 4/2003 | Davis et al. ................. | 296/37.12 |
| 6,929,309 B1 * | 8/2005 | Radu et al. .................. | 296/146.7 |
| 6,948,753 B2 * | 9/2005 | Yoshida et al. .............. | 296/1.08 |
| 6,959,954 B2 * | 11/2005 | Brandt et al. ................ | 296/1.08 |
| 7,445,233 B2 * | 11/2008 | McKimson ................. | 280/730.2 |
| 7,625,037 B2 * | 12/2009 | Gollehur et al. .......... | 296/193.07 |
| 7,837,248 B2 * | 11/2010 | Nedelman .................... | 296/39.1 |
| 7,854,457 B2 * | 12/2010 | Tanner ......................... | 296/1.08 |

FOREIGN PATENT DOCUMENTS

| | | |
|---|---|---|
| DE | 201 19 862 | 2/2002 |
| JP | 10-272974 B2 | 10/1998 |
| JP | 2002-127802 A | 5/2002 |

OTHER PUBLICATIONS

German Office Action for Application No. 10 2010 028 516.1, dated Sep. 21, 2012.

* cited by examiner

*Primary Examiner* — Joseph Pape
(74) *Attorney, Agent, or Firm* — Alston & Bird LLP (57) ABSTRACT

A cap mounting structure has an engagement hole formed in a peripheral edge part of an opening in an interior member; a protruding part is formed on a cap; an engagement part engaging with the engagement hole is formed by expanding an intermediate portion in the protrusion direction of the protruding part; the length in the expansion direction of the engagement part is set so as to be longer than the length of the engagement hole; the engagement part is inserted through the engagement hole while at least one of the engagement hole and the engagement part is elastically deformed, and the engagement part is engaged with the engagement hole by the elastic restoration of the elastically deformed part(s), whereby the cap is made in a temporarily held state in which the cap is held by the interior member; and from the temporarily held state, the cap is oscillated so as to be opened and closed.

7 Claims, 6 Drawing Sheets

CAP MOUNTING STRUCTURE

BACKGROUND OF THE INVENTION

1. Field of the Invention

The present invention relates to a cap mounting structure for mounting a cap to an opening formed in an interior member.

2. Description of Related Art

An interior member is sometimes formed with an opening for work, including bolt tightening work, and such an opening is closed by a cap after the completion of the work.

Conventionally, as a cap mounting structure, a structure in which a cap is oscillatably provided on an interior member via a thin-wall hinge as disclosed in Patent Document 1, and a structure in which a cap is slidably provided on an interior member as disclosed in Patent Document 2 have been adopted.

Patent Document 1: Japanese Patent No. 3364106
Patent Document 2: JP 2002-127802 A Unfortunately, in the technique of Patent Document 1, the thin-wall hinge interposed between the interior member and the cap is prone to appear on a design surface, which undesirably impairs the appearance. In addition, the mold construction is complicated. For the technique of Patent Document 2, since the cap is slidably provided on the interior member, the cap cannot slide in a location that is curved with a small radius of curvature, so that it is difficult to provide the cap in such a location.

SUMMARY OF THE INVENTION

An object of the present invention is to provide a cap mounting structure capable of improving the appearance, capable of simplifying the mold construction, and capable of providing a cap even in a location that is curved with a small radius of curvature.

The present invention is characterized by a cap mounting structure for mounting a cap to an opening formed in an interior member, in which an engagement hole is formed in a peripheral edge part of the opening;

a protruding part, which protrudes from a back surface of the cap and is inserted through the engagement hole, is formed;

an engagement part engaging with the engagement hole is formed by expanding an intermediate portion in the protrusion direction of the protruding part;

the length in the expansion direction of the engagement part is set so as to be longer than the length of the engagement hole in the direction corresponding to the expansion direction;

with the insertion of the protruding part through the engagement hole, the engagement part is inserted through the engagement hole while at least one of the engagement hole and the engagement part is elastically deformed, and the engagement part is engaged with the engagement hole by the elastic restoration of the at least one of the engagement hole and the engagement part, whereby the cap is made in a temporarily held state in which the cap is held by the interior member; and from the temporarily held state, the cap is formed so as to oscillate around the axis of the engagement part side so as to be opened and closed.

By this configuration, with the insertion of the protruding part through the engagement hole, the engagement part is inserted through the engagement hole while at least one of the engagement hole and the engagement part is elastically deformed, and the engagement part is engaged with the engagement hole by the elastic restoration of the at least one of the engagement hole and the engagement part. By this engagement of the engagement part with the engagement hole, the cap is made in a temporarily held state in which the cap is held by the interior member. Thereby, the cap can be preassembled to the interior member and can be conveyed to the assembly line. Therefore, as compared with the case where the cap and the interior member are conveyed separately, the parts control can be made easy, and the transportation cost and the packaging cost can be reduced. Further, at the time of assembling at the factory, there is no need for the worker to go to the line to fetch the cap, so that the work cost can be reduced.

The cap opened state and the cap closed state can be set by oscillating the cap around the axis of the engagement part side from the temporarily held state so as to be opened and closed. Further, in the cap closed state, the protruding part can be covered by the design surface of cap, so that the appearance can be prevented from being impaired.

Also, the cap and the interior member can be molded separately by using each molding tool. Therefore, the mold construction can be simplified, and the cap mounting structure configured as described above can be provided even in a location curved with a small radius of curvature.

In the present invention, if the position of the cap in the temporarily held state is set on the side of the position of the cap in the closed state from the center between the position of the cap in the opened state and the position of the cap in the closed state, the following effect can be achieved.

The protrusion length of the cap from the interior member can be shortened in the temporarily held state. Therefore, the cap can be restrained from taking a lot of space at the time of packaging of the interior member, and the cap can be prevented from becoming a hindrance to the conveying work.

In the present invention, if the engagement part is formed so as to have a cross section having a mountain shape that is convex to the opening side in a state of engaging with the engagement hole, and of a pair of slopes of the engagement part formed in the mountain shape, the slope of the engagement part on the side close to the back surface of the cap is brought into contact with an inner peripheral edge of the engagement hole on the opening side, whereby the position of the cap in the temporarily held state is determined, the following effect can be achieved.

By bringing the slope of the engagement part into contact with the inner peripheral edge of the engagement hole on the opening side, the inner peripheral edge inhibits the slope of the engagement part from oscillating to the open side, so that the cap cannot oscillate to the open side unless an external force is applied to the cap, whereby the position of the cap in the temporarily held state is determined. Thereby, in a style of packaging at the time of conveyance to the assembly line at the factory, the cap can be prevented from coming off the interior member.

In the present invention, if a protrusion protruding on the back side of the interior member is provided in an interior member part between the opening of the interior member and the engagement hole, and an insertion hole through which the protrusion is inserted in the cap opened state is formed in a protruding end part of the protruding part, the following effects can be achieved.

Since the protrusion is inserted through the insertion hole in the protruding end part of the protruding part, in the opened state, the cap can be prevented reliably from coming off the interior member. Also, the oscillation angle (rotation angle) of the cap can be increased, and the degree of opening of the cap with respect to the interior member can be increased.

In the present invention, if the interior member part is covered by the cap, the following effect can be achieved.

Since the protrusion is provided in the interior member part, a sink mark may occur on the surface of the interior member part. However, even if the sink mark occurs, since the interior member part is covered by the cap, the appearance of the cap mounting structure can be prevented from being impaired.

In the present invention, if a concave part is formed between the opening and the protrusion to form a weak part of the interior member part, which is weak against a force in the size increasing direction of the engagement hole, the following effect can be achieved.

When the interior member part is pressed by the engagement part of the cap with the insertion of the protruding part in the engagement hole, the protrusion becomes easy to fall down, and the interior member part becomes easy to deflect with the concave part being a supporting point. As a result, the engagement hole is easy to be elastically deformed and elastically restored, so that the size of the engagement hole can be increased and decreased easily. Therefore, the workability of the work of mounting the cap to the interior member can be improved.

In the present invention, if the peripheral edge part of the opening is depressed in a level difference shape to the back side of the interior member with respect to a design surface of the interior member, the following effect can be achieved.

A level difference can be restrained from being formed between the design surface of cap and the design surface of interior member, so that the appearance can be improved.

According to the present invention, there can be provided a cap mounting structure capable of improving the appearance, capable of simplifying the mold construction, and capable of providing a cap even in a location curved with a small radius of curvature.

DETAILED DESCRIPTION OF PREFERRED EMBODIMENTS

An embodiment of the present invention will now be described with reference to the accompanying drawings.

Figure 1:
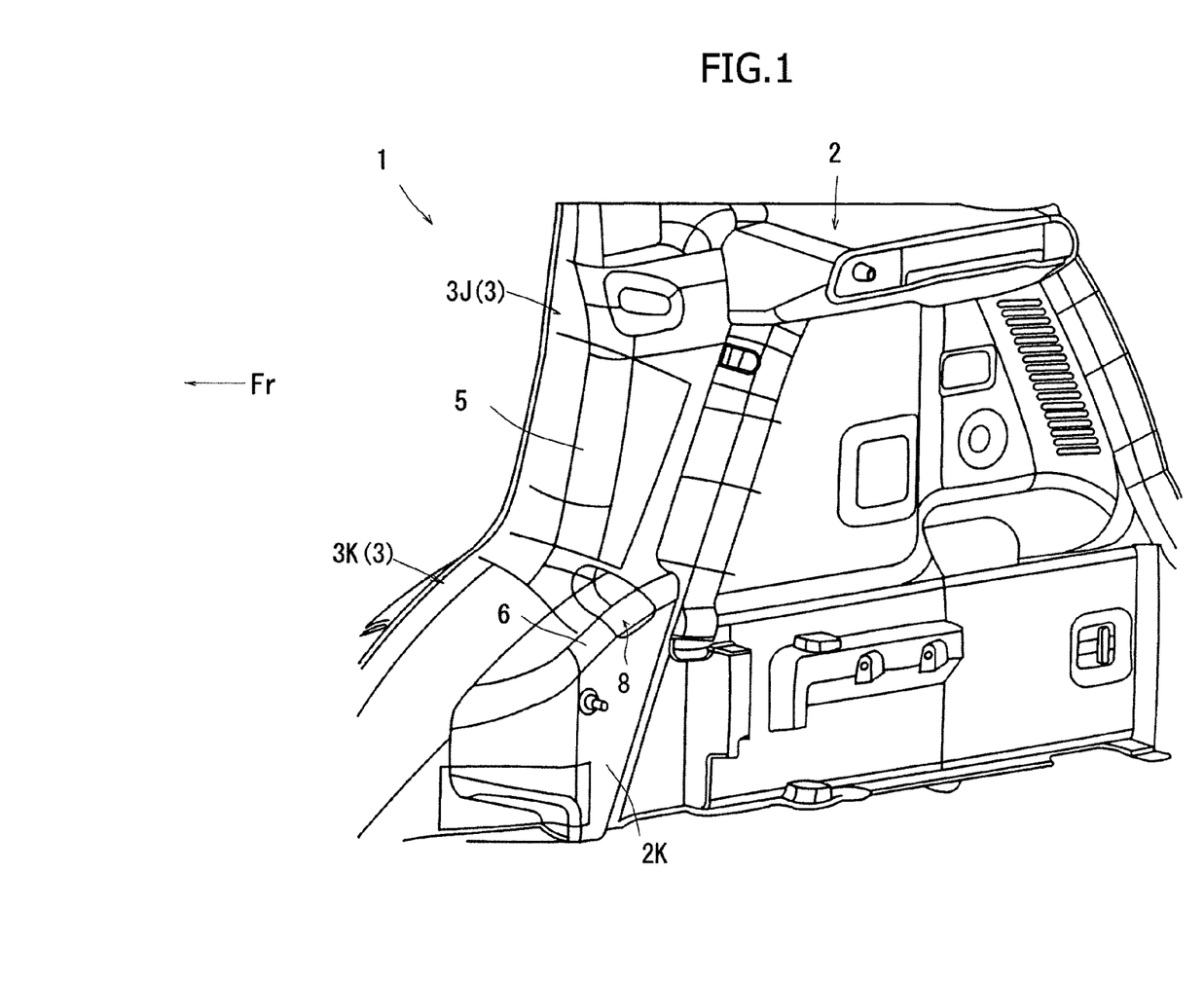
FIG. 1 is a perspective view of a rear luggage trim (interior member)

FIG. 1 shows a rear luggage trim 1 (corresponding to an interior member) of an automobile. The rear luggage trim 1 includes a trapezoidal side wall part 2 and a front wall part 3 extending from the front end part of the side wall part 2 to the outside in the vehicle width direction, and covers a cargo compartment in the rear of a rear seat (rear luggage). The front wall part 3 is configured so that a lower half part 3K thereof is formed in a quarter arc shape convex to the front upward side and an upper half part 3J extends inclined rearward and upward from the upper end part of the lower half part 3K. The lower half part 3K of the front wall part 3 and the front end part of a lower half part 2K of the side wall part 2 cover a wheel housing.

Figure 5A:
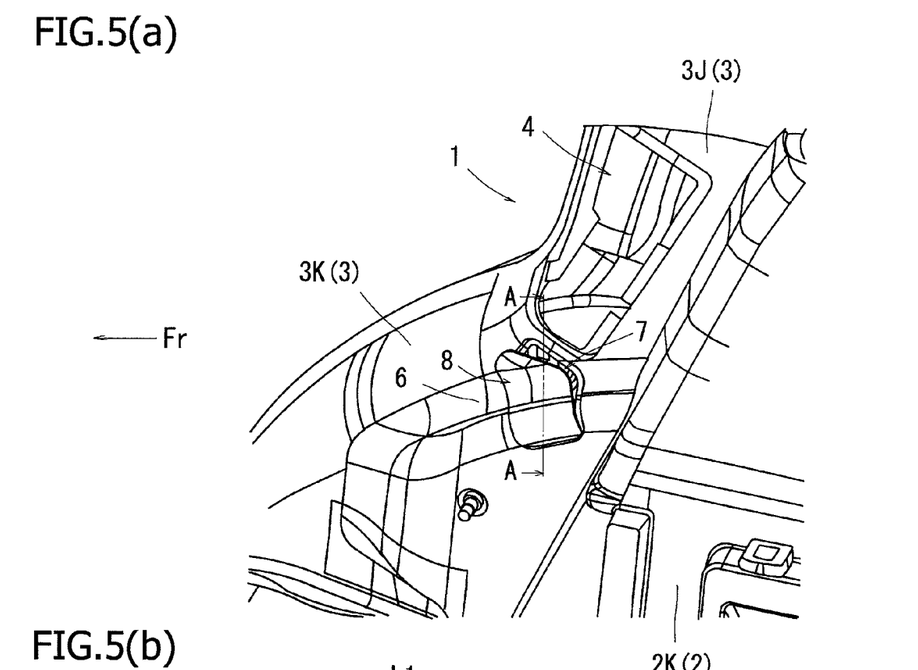
FIG. 5(a) is a perspective view showing a cap in a temporarily held state and a rear luggage trim.

As shown in FIG. 5(a), in the upper half part 3J of the front wall part 3, a large first opening 4 is formed. After the rear luggage trim 1 has been assembled to a vehicle body, a rear side airbag is housed in a housing part on the inside of the front wall part 3 through the first opening 4, and the first opening 4 is covered with a cover 5 (refer to FIG. 1).

Figures 2, 3, 4:
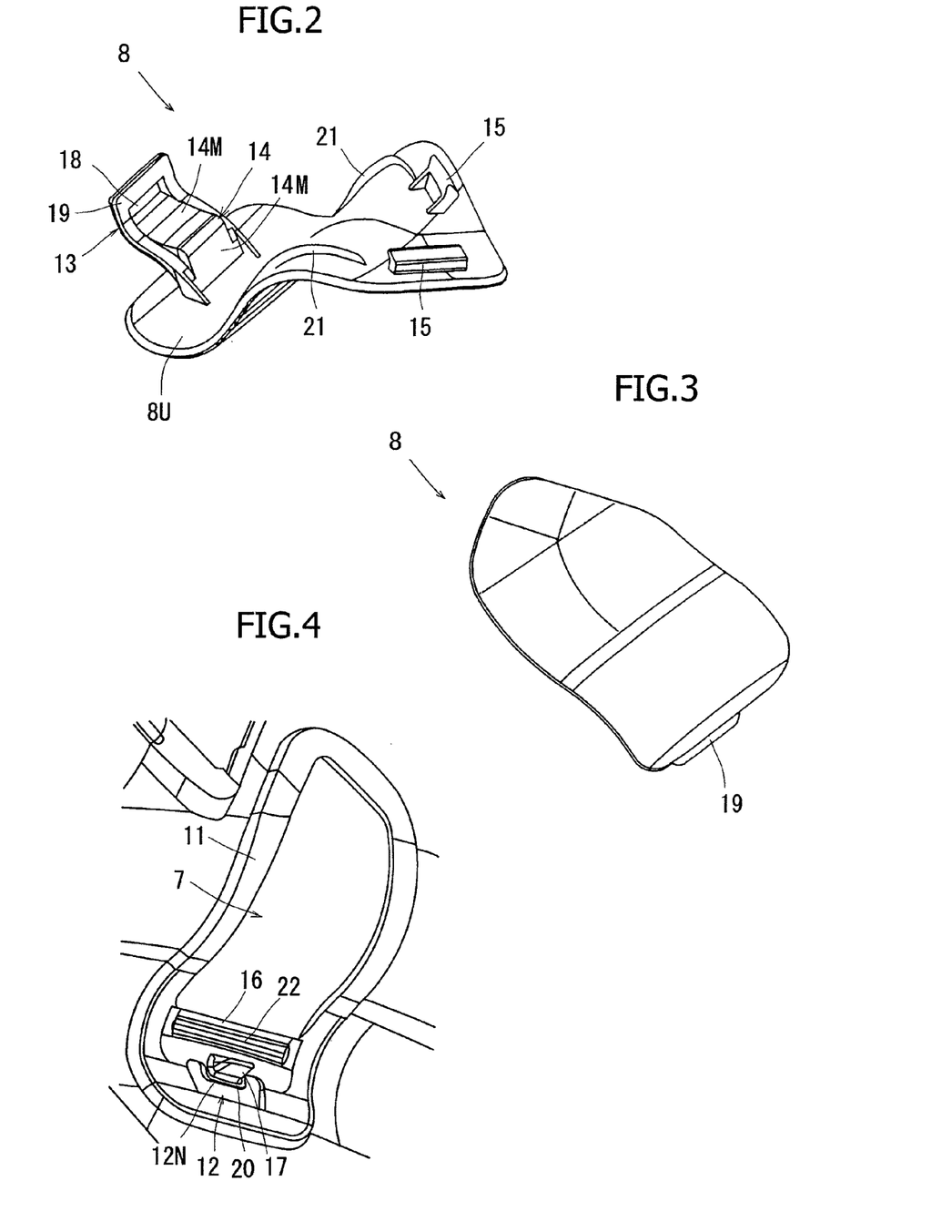
FIG. 2 is a perspective view of a cap viewed from the inside.
FIG. 3 is a perspective view of a cap viewed from the outside.
FIG. 4 is a perspective view showing the inside of a portion around an opening of a rear luggage trim.

As shown in FIGS. 5(a), 5(b), 6(a) and 6(b), a small second opening 7 of a longitudinally long trapezoidal shape is formed in a connecting part 6 between the upper end part of the lower half part 3K of the front wall part 3 and front end part of the side wall part 2, and a cap 8 of a longitudinally long trapezoidal shape for opening and closing the second opening 7 is provided (refer to FIGS. 2 and 3). The connecting part 6 is formed in a gently corrugated curved shape in its longitudinal cross section, and the cap 8 is also formed in a gently corrugated curved shape in its longitudinal cross section.

Figure 7A:
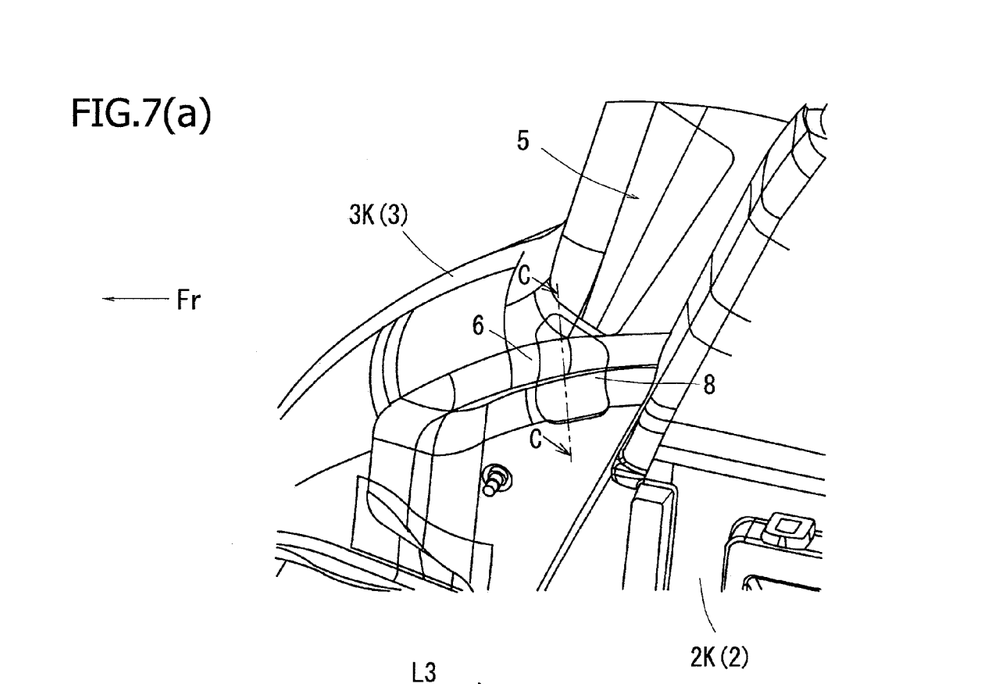
FIG. 7(a) is a perspective view showing a cap in a closed state and a rear luggage trim.
Figure 7B:
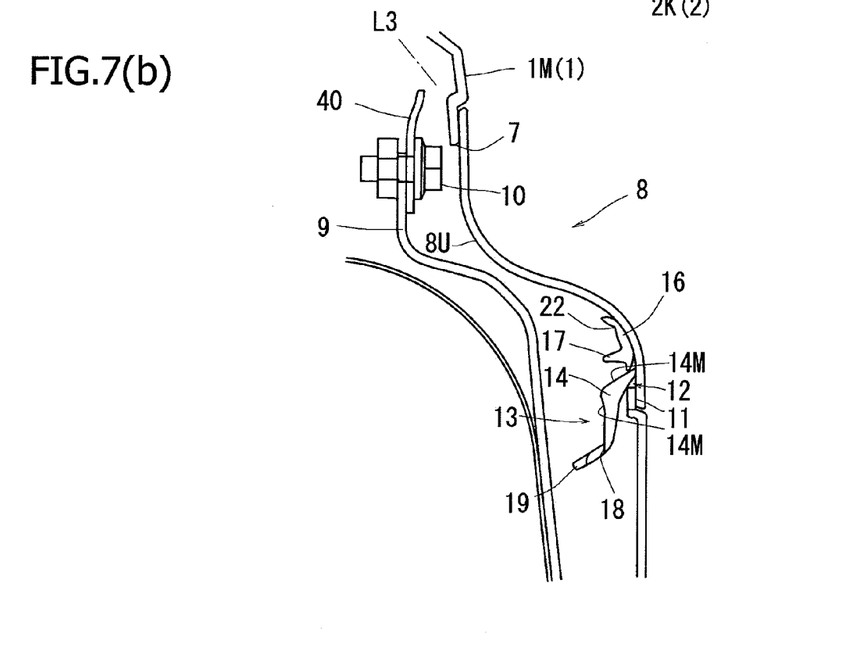
FIG. 7(b) is a sectional view taken along the line C-C of FIG. 7(a)

A bracket 40 of the rear side airbag (refer to FIG. 7(b)) is exposed through the second opening 7 by opening the cap 8, and the bracket 40 is fixed to a vehicle body panel 9 by tightening a bolt 10. That is, the second opening 7 is a work hole for performing work of tightening the bolt 10. The second opening 7 is closed by the cap 8 after the work of tightening the bolt 10 is completed.

Figure 5B:
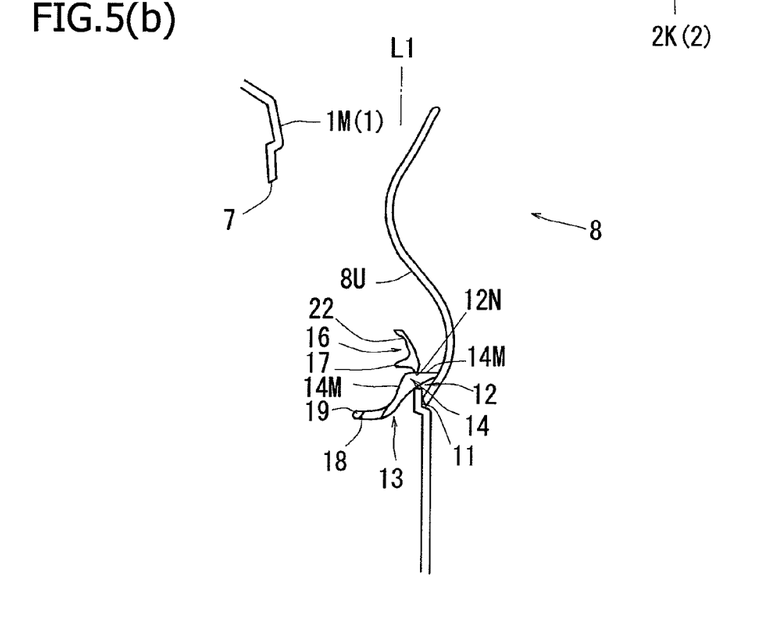
FIG. 5(b) is a sectional view taken along the line A-A of FIG. 5(a)

Next, a cap mounting structure for mounting the cap 8 to the second opening 7 will be described, Cap Mounting Structure As shown in FIGS. 4 and 5(b), the configuration is such that a peripheral edge part 11 of the second opening 7 is depressed in a level difference shape throughout the entire periphery to the back side of the rear luggage trim 1 with respect to a design surface 1M of the rear luggage trim 1, and an upward U-shaped engagement hole 12 is formed in the lower end part of the peripheral edge part 11.

Also, as shown in FIGS. 2 and 5(b), the cap 8 is formed with a protruding piece 13 (corresponding to a protruding part) that protrudes from a back surface 8U in the lower end part of the cap 8 and is inserted through the engagement hole 12, and an engagement part 14 engaging with the engagement hole 12 is formed by expanding an intermediate portion in the protrusion direction and the width direction of the protruding piece 13. The protruding piece 13 protrudes from a lower end portion separating a predetermined length upward from the lower end edge of the cap 8.

The engagement part 14 is formed so as to have a cross section having a gentle mountain shape that is convex to the second opening 7 side in a state of engaging with the engagement hole 12, and the length in the expansion direction of the engagement part 14 (the length between the bottom side and the vertex of the mountain shape, that is, the wall thickness of the engagement part 14) is set so as to be longer than the length of the engagement hole 12 in the direction corresponding to the expansion direction (the short side length of the engagement hole 12). Also, as viewed from the expansion direction of the engagement part 14, the engagement part 14 and the protruding piece 13 are formed in a rectangular shape having a fixed width.

The configuration is made such that, with the insertion of the protruding piece 13 through the engagement hole 12, the engagement part 14 is inserted through the engagement hole 12 while the engagement hole 12 (the inner periphery part of the engagement hole 12) is elastically deformed so as to increase the size thereof, and the engagement part 14 is engaged with the engagement hole 12 by the elastic restoration of the engagement hole 12, whereby the cap 8 is made in a temporarily held state in which the cap 8 is held by the rear luggage trim 1 (refer to FIGS. 5(a) and 5(b)).

Thereby, the cap 8 can be preassembled to the rear luggage trim 1 and can be conveyed to the assembly line. Therefore, as compared with the case in which the cap 8 and the rear luggage trim 1 are conveyed separately, the parts control can be made easy, and the transportation cost and the packaging cost can be reduced. Furthermore, at the time of assembling at the factory, there is no need for the worker to go to the line to fetch the cap 8, so that the work cost can be reduced.

Of a pair of slopes 14M of the engagement part 14 forming the mountain shape, the slope 14M of the engagement part 14 on the side close to the back surface 8U of the cap 8 is brought into contact with an inner peripheral edge 12N of the engagement hole 12 on the second opening 7 side, thereby determining the position L1 of the cap 8 in the temporarily held state.

That is, by bringing the slope 14M of the engagement part 14 into contact with the inner peripheral edge 12N of the engagement hole 12 on the second opening 7 side, the slope 14M of the engagement part 14 is inhibited from oscillating to the open side by the inner peripheral edge 12N, so that the cap 8 cannot oscillate to the open side unless an external force is applied to the cap 8, whereby the position L1 of the cap 8 in the temporarily held state is determined. Thereby, in a style of packaging at the time of conveyance to the assembly line at the factory, the cap 8 can be prevented from coming off the rear luggage trim 1.

The configuration is made such that, as shown in FIGS. 5(a), 5(b), 6(a), 6(b) and 8, from the temporarily held state in which the cap 8 is held by the rear luggage trim 1, the cap 8 is oscillated to the open side around the axis of the engagement part 14 side, and can be set in an opened state. In this opened state, the work of tightening the bolt 10 can be performed. Furthermore, the configuration is made such that, as shown in FIGS. 6(a), 6(b), 7(a), 7(b) and 8, from the opened state (the fully opened state of the cap 8), the cap 8 is oscillated to the closing side around the axis of the engagement part 14 side, and can be set in a closed state. That is, the configuration is made such that, from the temporarily held state, the cap 8 can be oscillated around the axis of the engagement part 14 side so as to be opened and closed. As shown in FIG. 2, a plurality of engagement claws 15 are formed in the upper end part, which is an oscillation end part, of the cap 8, so that in the closed state of the cap 8, the engagement claws 15 engage with engaged parts on the vehicle body side.

Figure 8:
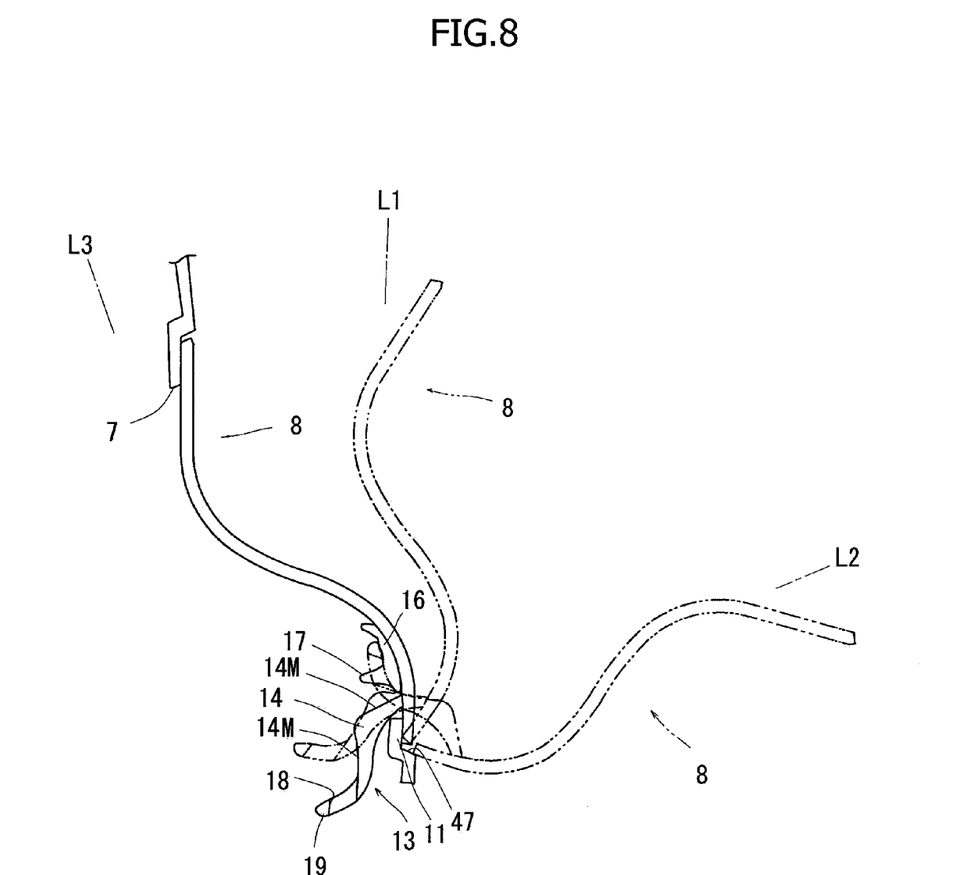
FIG. 8 is a longitudinal sectional view showing the positional relationship among a cap in a temporarily held state, a cap in an opened state, and a cap in a closed state.

As shown in FIG. 8, the position L1 of the cap 8 in the temporarily held state is set on the position L3 side of the cap 8 in a closed state from the center between the position L2 of the cap 8 in an opened state and the position L3 of the cap 8 in the closed state. As a result, the protrusion length of the cap 8 from the rear luggage trim 1 can be shortened. Therefore, the cap 8 can be restrained from taking a lot of space at the time of packaging of the rear luggage trim 1, and the cap 8 can be prevented from becoming a hindrance to the conveying work.

Figure 6A:
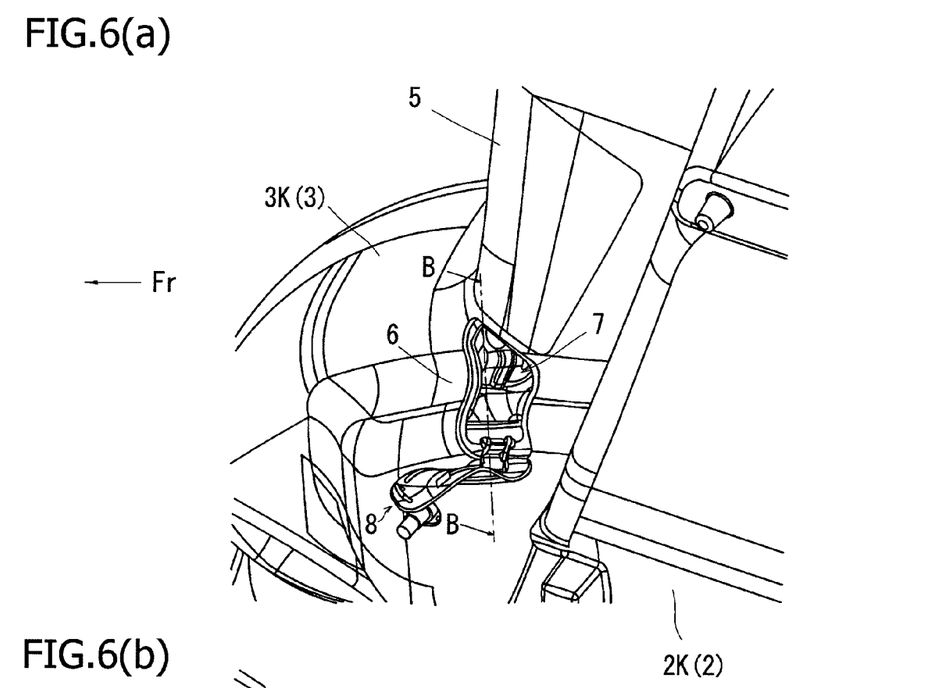
FIG. 6(a) is a perspective view showing a cap in an opened state and a rear luggage trim.
Figure 6B:
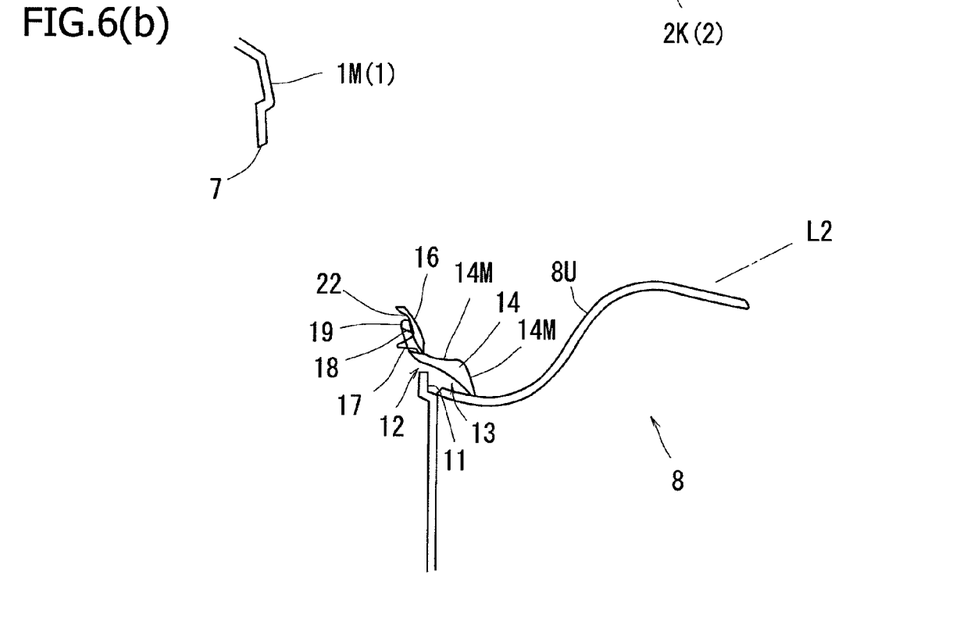
FIG. 6(b) is a sectional view taken along the line B-B of FIG. 6(a)

Also, as shown in FIGS. 4 and 5(b), a tapered protrusion 17 protruding on the back side of the rear luggage trim 1 is provided in a rear luggage trim part 16 (corresponding to an interior member part) between the second opening 7 of the rear luggage trim 1 and the engagement hole 12, and an insertion hole 18 through which the protrusion 17 is inserted in the opened state of the cap 8 is formed in a protruding end part 19 of the protruding piece 13 (refer to FIG. 6(b)). The protruding end part 19 bends to the second opening 7 part side with respect to the engagement part 14.

The rear luggage trim part 16 is formed so as to be slender in the width direction of the second opening 7, and the protrusion 17 protrudes from a convex piece 20 (refer to FIG. 4) protruding from an intermediate portion of the rear luggage trim part 16 (an intermediate portion of the rear luggage trim part 16 in the width direction of the second opening 7) to the engagement hole 12 side. The protrusion 17 is formed so as to have a transverse cross section of a rectangular shape that is long in the width direction of the rear luggage trim 1.

As shown in FIG. 2, the insertion hole 18 is formed in an intermediate portion in the width direction of the protruding piece 13 so as to have a rectangular slit shape that is slender in the width direction of the cap 8, and is arranged at the same position with the same length as the engagement part 14 in the width direction of the cap 8. On the back surface 8U of the cap 8, a plurality of reinforcing ribs 21 are projectingly provided along the lengthwise direction of the cap 8.

As shown in FIG. 6(b), in the opened state of the cap 8, the protrusion 17 is inserted through the insertion hole 18 in the protruding end part 19 of the protruding piece 13, so that in the opened state, the cap 8 can be reliably prevented from coming off the rear luggage trim 1. Also, the oscillation angle (rotation angle) of the cap 8 can be increased, and the degree of opening of the cap 8 with respect to the rear luggage trim 1 can be increased. As shown in FIGS. 6(a) and 6(b), in the opened state of the cap 8, as viewed from the vehicle width direction, almost the entirety of the second opening 7 appears so that the work of tightening the bolt 10 can be performed smoothly through the second opening 7. The bolt 10 is located on the upper end part side of the second opening 7.

As shown in FIGS. 7(a) and 7(b), the rear luggage trim part 16 is covered by the cap 8 in the closed state. Since the protrusion 17 is provided in the rear luggage trim part 16, a sink mark may occur on the surface of the rear luggage trim part 16. However, even if the sink mark occurs, since the rear luggage trim part 16 is covered by the cap 8, the appearance of the cap mounting structure can be prevented from being impaired.

As shown in FIGS. 4 and 5(b), a concave part 22 that is slender in the lengthwise direction of the rear luggage trim part 16 is formed between the second opening 7 and the protrusion 17 to form a weak part of the rear luggage trim part 16, which is weak against a force in the size increasing direction of the engagement hole 12. The concave part 22 is formed throughout almost the entire length of the rear luggage trim part 16.

Therefore, when the rear luggage trim part 16 is pressed by the engagement part 14 of the cap 8 with the insertion of the protruding piece 13 in the engagement hole 12, the protrusion 17 may easily fall down, and the rear luggage trim part 16 may be easily deflected with the concave part 22 being a supporting point. As a result, the engagement hole 12 is easy to be elastically deformed and elastically restored, so that the size of the engagement hole 12 can be increased and decreased easily. Therefore, the workability of the work of mounting the cap 8 to the rear luggage trim 1 can be improved. Operation of cap 8 from temporarily held state to opened state When the cap 8 is operated to be opened intentionally from the temporarily held state (FIGS. 5(a) and 5(b)), of the pair of slopes 14M of the engagement part 14, the slope 14M on the side close to the back surface 8U of the cap 8 oscillates to the open side of the cap 8 while elastically deforming the engagement hole 12 (the inner peripheral part of the engagement hole 12) to increase the size thereof. At this time, the rear luggage trim part 16 deflects with the concave part 22 being the supporting point, and the engagement hole 12 is elastically deformed easily.

Then, the vertex of the engagement part 14 passes through the engagement hole 12 and slips out of the engagement hole 12 to the vehicle interior side. Thereby, the engagement hole 12 is elastically restored so that the size thereof is decreased. When the cap 8 is further operated to be opened, the protrusion 17 is inserted through the insertion hole 18 in the protruding end part 19 of the protruding piece 13, so that the cap 8 becomes in the opened state (fully opened state) (FIGS. 6(*a*) and 6(*b*)).

Operation of Cap 8 from Opened State to Closed State

When the cap 8 is operated to be closed from the opened state (FIGS. 6(*a*) and 6(*b*)), the insertion hole 18 in the protruding end part 19 of the protruding piece 13 comes off the protrusion 17. Then, of the pair of slopes 14M of the engagement part 14, the slope 14M on the side distant from the back surface 8U of the cap 8 oscillates to the closing side of the cap 8 while elastically deforming the engagement hole 12 (the inner peripheral part of the engagement hole 12) to increase the size thereof. At this time, the rear luggage trim part 16 deflects with the concave part 22 being the supporting point, and the engagement hole 12 is elastically deformed easily.

Then, the vertex of the engagement part 14 passes through the engagement hole 12 and slips out of the engagement hole 12 to the vehicle exterior side. Thereby, the engagement hole 12 is elastically restored so that the size thereof is decreased. When the cap 8 is further operated to be closed, the engagement claws 15 on the back side of the cap 8 engage with the engaged parts on the vehicle body side, so that the cap 8 becomes in the closed state (FIGS. 7(*a*) and 7(*b*)).

As shown in FIG. 8, in the operation of the cap 8 from the temporarily held state to the opened state and from the opened state to the closed state, the lower end edge of the cap 8 is positioned close to a level difference face 47 (a level difference surface facing the upper part) of the peripheral edge part 11 of the second opening 7 and above the level difference face 47.

Another Embodiment

The configuration may be made such that, with the insertion of the protruding piece 13 through the engagement hole 12, the engagement part 14 is inserted through the engagement hole 12 while the protruding piece 13 (or both of the protruding piece 13 and the engagement hole 12) is elastically deformed to decrease the size thereof, and the protruding piece 13 (or both of the protruding piece 13 and the engagement hole 12) is elastically restored, whereby the engagement part 14 is engaged with the engagement hole 12.

What is claimed is:

1. A cap mounting structure, comprising:
an interior member defining an opening therein;
an engagement hole defined in a peripheral edge part of the interior member adjacent to the opening;
a cap having a protruding part, which protrudes from a back surface of the cap along a protruding direction and is inserted through the engagement hole, the protruding part having an engagement part engaging with an inner peripheral edge of the engagement hole, the engagement part comprising an intermediate portion of the protruding part that is expanded in an expansion direction;
the engagement part having a length in the expansion direction longer than a length of the engagement hole in a direction corresponding to the expansion direction;
wherein when the protruding part is inserted through the engagement hole, at least one of the engagement hole and the engagement part is elastically deformed, and the engagement part is engaged with the engagement hole by elastic restoration of the at least one of the engagement hole and the engagement part, whereby the cap is temporarily held in a partially open position in which the cap is captive by the interior member; and
from the temporarily held partially open position, the cap is pivotable around a pivot axis defined at a side of the engagement part so as to be pivotable to a fully open position and to a closed position.

2. The cap mounting structure according to claim 1, wherein the cap in the temporarily held partially open position is closer to the closed position of the cap than to the fully open position of the cap.

3. The cap mounting structure according to claim 1, wherein the engagement part has a mountain shape that is convex in the expansion direction, the mountain shape defining a pair of slopes that meet at a vertex, one of the slopes being closer to a back surface of the cap than is the other of the slopes, wherein the slope closer to the back surface is positioned to be brought into contact with a portion of the inner peripheral edge of the engagement hole when the cap is in the temporarily held partially open position.

4. The cap mounting structure according to claim 3, further comprising an interior member part disposed on a back side of the interior member, the interior member part defining a protrusion protruding on the back side of the interior member between the opening of the interior member and the engagement hole, and
wherein the protruding part of the cap has a protruding end part that defines an insertion hole through which the protrusion of the interior member part is received when the cap is pivoted to the fully open position.

5. The cap mounting structure according to claim 4, wherein the interior member part is covered by the cap.

6. The cap mounting structure according to claim 4, wherein the interior member part defines a concave part between the opening and the protrusion to form a weak part of the interior member part, which is weak against a force in a size increasing direction of the engagement hole.

7. The cap mounting structure according to claim 1, wherein the interior member defines a design surface that surrounds the peripheral edge part of the interior member adjacent the opening, and the peripheral edge part is depressed toward a back side of the interior member with respect to the design surface of the interior member.

* * * * *